(12) United States Patent
Mohamed et al.

(10) Patent No.: US 11,544,796 B1
(45) Date of Patent: Jan. 3, 2023

(54) CROSS-DOMAIN MACHINE LEARNING FOR IMBALANCED DOMAINS

(71) Applicant: Amazon Technologies, Inc., Seattle, WA (US)

(72) Inventors: Moustafa Abdalla Mohamed, Kirkland, WA (US); Lifan Chen, Mercer Island, WA (US); Sandesh Govind Shridhar, Bellevue, WA (US); Raghava Gupta Valiveti, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 671 days.

(21) Appl. No.: 16/599,607

(22) Filed: Oct. 11, 2019

(51) Int. Cl.
| | |
|---|---|
| G06K 9/62 | (2022.01) |
| G06Q 40/00 | (2012.01) |
| G06Q 10/08 | (2012.01) |
| G06N 3/04 | (2006.01) |
| G06F 17/16 | (2006.01) |
| G06N 20/00 | (2019.01) |
| G06Q 20/20 | (2012.01) |
| G06Q 30/02 | (2012.01) |

(52) U.S. Cl.
CPC ............. *G06Q 40/10* (2013.01); *G06F 17/16* (2013.01); *G06K 9/6215* (2013.01); *G06K 9/6223* (2013.01); *G06N 3/0454* (2013.01); *G06N 20/00* (2019.01); *G06Q 10/0831* (2013.01); *G06Q 20/207* (2013.01); *G06Q 30/0283* (2013.01)

(58) Field of Classification Search
CPC combination set(s) only.
See application file for complete search history.

(56) References Cited

U.S. PATENT DOCUMENTS

2021/0326748 A1* 10/2021 van Vredendaal ... G06K 9/6257

\* cited by examiner

*Primary Examiner* — Edward Park
(74) *Attorney, Agent, or Firm* — K&L Gates LLP

(57) ABSTRACT

Devices and techniques are generally described for cross-domain machine learning. A first machine learning model may be trained using first data of a first domain. Predictions may be generated by inputting a plurality of domain data from other domains apart from the first domain into the first machine learning model. For each of the predictions, a prediction error may be determined. A grouping of similar domains from among the other domains may be determined based on the prediction errors. A second machine learning model may be trained for the grouping of similar domains.

20 Claims, 8 Drawing Sheets

US 11,544,796 B1

CROSS-DOMAIN MACHINE LEARNING FOR IMBALANCED DOMAINS

BACKGROUND

Machine learning is a field of artificial intelligence that allows computer-implemented systems to perform a task without the use of task-specific code. Machine learning systems may be trained to progressively improve performance of a task using sets of training data. In supervised machine learning, annotated data (e.g., data with a labeled input and desired output) can be used to "train" a machine learning model. During training, parameters (e.g., weights and/or biases) of the machine learning model are adjusted so that the output of the machine learning model for a given input matches the desired output from the annotated data. Thereafter, during inference, the trained machine learning model can make predictions when provided with unannotated input data. Accuracy and/or predictive value of machine learning models are often a function of the quantity and quality of annotated data used to train the machine learning model.

DETAILED DESCRIPTION

Figure 1:
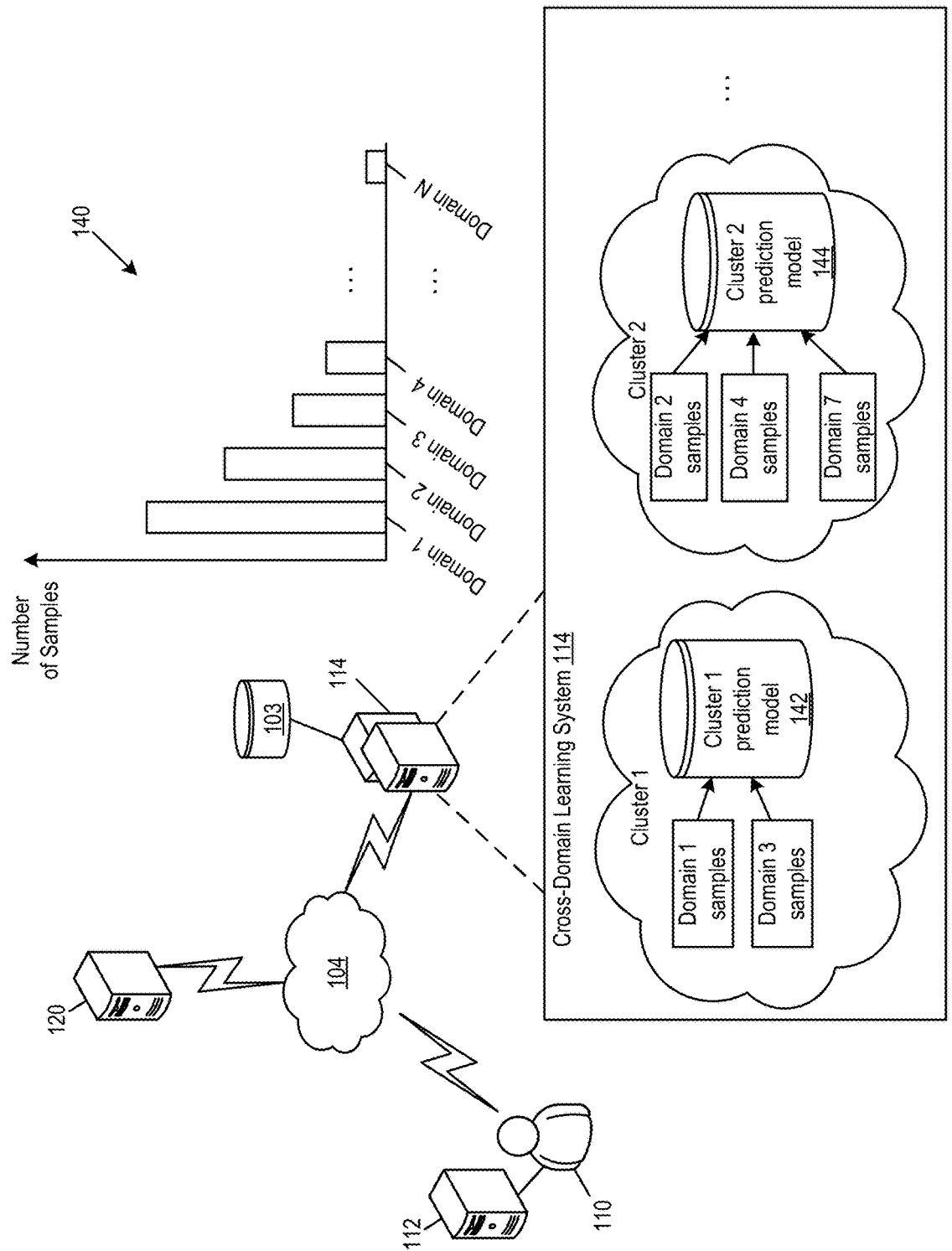
FIG. 1 is a diagram illustrating a cross-domain learning system, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

Deep learning networks often require large amounts of training data in order to achieve acceptable performance during prediction. In some examples, different machine learning models are deployed for prediction in a variety of different domains.

For example, a plurality of machine learning models can be used to predict news articles that may be of interest to users. In the example, there are different categories of news articles. For example, sports news, business news, local news, current events, etc. In the foregoing example, different machine learning language models may be used to predict the news articles that are of interest for each of the different categories. In the example, each different category may be a separate domain. For example, a first machine learning model may be used to predict sports news articles (a first domain); a second machine learning model may be used to predict business news articles (a second domain), and so on. Each machine learning model is trained using training data that corresponds to the particular domain of that machine learning model. For example, previously-viewed sports articles are used to train the machine learning model that is tasked with prediction of sports articles, previously-viewed business articles are used to train the machine learning model that is tasked with prediction of business articles, etc. In some other examples, a plurality of machine learning models may be used to predict weather patterns for different geographical locales. In such an example, each machine learning model used for weather prediction for a particular geographical locale may be trained with data collected from that geographical locale. In this example, there is a single domain corresponding to each geographical locale. In yet other examples, a plurality of machine learning models may be used to predict be used to predict the final scores of soccer matches. Each pairing of teams may treated as a separate category, with the previous outcomes between each pairing forming the dataset for each domain. For example, soccer matches played between the U.S. and France may form a first domain, soccer matches played between the U.S. and Germany may form a second domain, soccer matches played between Turkey and Mexico may form a third domain, and so on. A first machine learning model may be trained using the dataset for the first domain to predict the outcomes of future soccer matches between the U.S. and France.

Formally, a domain $\mathcal{D}$ comprises two components: a feature space $\mathcal{F}$ and a marginal probability distribution P(F), where F={$f_1, \ldots, f_n$}∈$\mathcal{F}$. Next, given a domain $\mathcal{D}$ a task $\mathcal{T}$ is defined as $\mathcal{T}$ ={Y, f(•)}, where Y is a true label and f(x) is a prediction value of instance x∈$\mathcal{X}$ which can be written as f($x$)=P(y|$x$).

However, the amount of training data available for each domain is often not the same, and in some scenarios the amount of training data available for each domain is deeply imbalanced. As the amount (and quality) of training data affects the predictive performance of machine learning models (and in particular deep learning models), prediction may suffer in domains with a relatively small amount of training data available. Accordingly, described herein are various techniques to circumvent the shortcomings of the lack of training data for certain domains. In particular, computer-implemented techniques are described whereby similarities between different domain-specific datasets (and/or machine learning models trained on the domain-specific datasets) are determined. Thereafter, data from similar domains are clustered together. Using a clustered dataset, machine learning models can be trained and used for prediction for each domain in the cluster. Clustering increases the dataset size (relative to using only a single domain) thereby increasing the amount of data available for training a particular machine learning model (e.g., a cluster-specific machine learning model).

In various examples, transfer learning techniques are used to determine a similarity matrix between different domains. Typically, the similarity matrix is non-symmetric. In other words, the similarity matrix and the transpose of the similarity matrix are not the same. Accordingly, in some embodiments, various techniques are used to transform the similarity matrix into a symmetric matrix. In an example embodiment, a symmetric similarity matrix is compatible with various graph clustering techniques that are used to determine a similarity between different domains and group (or "cluster") the training data for the domains accordingly. Thereafter, one or more machine learning models (depending on the desired implementation) are trained for the cluster using the combined dataset for each member domain of the cluster. In an example embodiment, various oversampling techniques are used during training to further improve performance of the trained machine learning models by emphasizing under-sampled domain data.

Embodiments of the various computer-implemented techniques described herein may drastically improve performance and reduce over-fitting for machine learning domains with relatively small amounts of training data. Additionally, various techniques described herein may reduce computing overhead, as a single machine learning model may be deployed for multiple domains without significantly impacting performance (and in many cases improving performance relative to deployment of a model for each domain).

For illustrative purposes, an example related to prediction of import fee deposits used when exporting product orders to different countries is discussed herein. In this example, the relevant domains each include a source country and a destination country. For example, a first domain may be for products shipped from the United States to the United Kingdom. A second domain may be products shipped from Brazil to Mexico, and so on. There may be an imbalance in the amount of data available for each domain. For example, there may be a paucity of data describing import deposit fees for goods shipped from Turkey to Mexico, while there may be a comparatively large amount of data describing import deposit fees for goods shipped from the United States to France.

It should be appreciated that the various techniques described herein may be used in any desired machine learning context and for any type of domain. Accordingly, the prediction of import fee deposits for different countries is merely an example of a scenario in which the various techniques described herein may be useful. The domains need not be limited to geographic domains. As one alternate example, the domains could instead be related to performance of different systems. Additionally, although various machine learning algorithms are discussed for illustrative purposes, the various cross-learning techniques described herein are agnostic to the particular machine learning algorithms used.

FIG. 1 is a diagram illustrating a cross-domain learning system, according to various embodiments of the present disclosure. In various examples, a user 110 may order a product to be delivered from a source country to a destination country using a computing device 112. In an embodiment, the order is sent over network 104 (e.g., the Internet) to a transactional server 120 (e.g., an online retailer computing device) that may process the order. During order processing the transactional server may estimate an import fee deposit to be charged by the destination country.

Machine learning models can be used to predict the import deposit fee for items originating in a source country and sent to a destination country. Traditional rule-based approaches for determining an import fee deposit are difficult to develop and maintain due to the large number of different country-specific rules and because the rules may constantly change over time and/or not be consistently enforced. Accordingly, machine learning-based approaches may be well-suited for predicting import fee deposits based on past orders that have been charged import deposit fees in each relevant jurisdiction. In this example, products sent from the user's selected source country to the user's selected destination country may be considered a first domain (e.g., Domain 1). As shown in histogram 140 of FIG. 1, the number of samples in Domain 1 is greater than the number of samples for any of the other Domains 2-N depicted in FIG. 1. In this context, the samples represent data for completed transactions including the actual import deposit fees charged for the transactions as well as characteristics of the transaction (such as price of the order, weight, size dimensions, etc.). Accordingly, there may be sufficient training data available to train a machine learning model (e.g., a neural network) to predict the import fee deposits for Domain 1 orders. However, as can be seen in FIG. 1, various other domains (e.g., Domain N) have a relatively small number of samples available for machine learning model training relative to Domain 1. Accordingly, a machine learning model (and, in particular, deep learning models) trained for prediction using a relatively small amount of data available for that domain (e.g., Domain N) may suffer from over-fitting and may have relatively poor performance relative to a domain with more training samples available (e.g., Domain 1). Accordingly, the cross-domain learning techniques described herein can be used to increase performance of domains with relatively small amounts of training data available, as described below.

The training samples for a particular domain may be tensors (e.g., vectors) representing various components of the order. For example, a training sample from Domain 1 may include a category code of a product, package dimensions, package weight, price of the order, shipping destination (e.g., within the destination country), postal code, shipping option selected, etc. Additionally, the training samples from Domain 1 may include the ground truth data (e.g., a label indicating an actual value for the sample) indicating the actual import deposit fee charged for the order with the foregoing characteristics.

Cross-domain learning system 114 may be effective to determine similarities between datasets for the different domains and/or similarities between different domain-specific machine learning models trained using the data specific to that domain. In the example embodiment shown in FIG. 1, cross-domain learning system 114 has determined that Domain 1 samples and Domain 3 samples are similar. Accordingly, cross-domain learning system 114 has grouped Domain 1 samples and Domain 3 samples together in Cluster 1. Determining similarity between the domain-specific datasets and/or the domain-specific machine learning models is described below in reference to FIG. 2. Cross-domain learning system 114 uses Domain 1 samples (e.g., the dataset corresponding to Domain 1) and Domain 3 samples (the dataset corresponding to Domain 3) to train a single Cluster 1 prediction model 142 (e.g., a cluster-specific machine learning model). Although a single cluster prediction model is shown for Cluster 1, any number of cluster prediction models may be trained for each cluster. For example, Cluster 1 may instead include the samples from 15 different domains (or any number of domains). In this example, Cluster 1 may train any number of machine learning models for Cluster 1 using the data from the 15 different domains (and/or using subsets of the data from the 15 different domains).

Similarly, in the example depicted in FIG. 1, cross-domain learning system 114 has determined that Domain 2 samples, Domain 4 samples, and Domain 7 samples are similar. Accordingly, cross-domain learning system 114 uses Domain 2 samples (e.g., the dataset corresponding to Domain 2), Domain 4 samples (e.g., the dataset corresponding to Domain 4), and Domain 7 samples (the dataset corresponding to Domain 7) to train a single Cluster 2 prediction model 144.

Thereafter, cluster 1 prediction model 142 may be used to predict the import deposit fee for any order in Domain 1 or Domain 3. Similarly, cluster 2 prediction model 144 may be used to predict the import deposit fee for any order in Domain 2, Domain 4, or Domain 7.

Any number of clusters may be used. In various examples, the number of clusters may be selected and/or may be determined by solving an optimization problem with one or more constraints (e.g., business constraints related to the overhead of maintaining a certain number of online models).

Cross-domain learning system 114 may include and/or be configured in communication with one or more non-transitory computer-readable memories 103. The one or more non-transitory computer-readable memories 103 may store instructions that, when executed by at least one processor of cross-domain learning system 114, may program the at least one processor to perform the various cross-domain learning techniques described herein.

Figure 2:
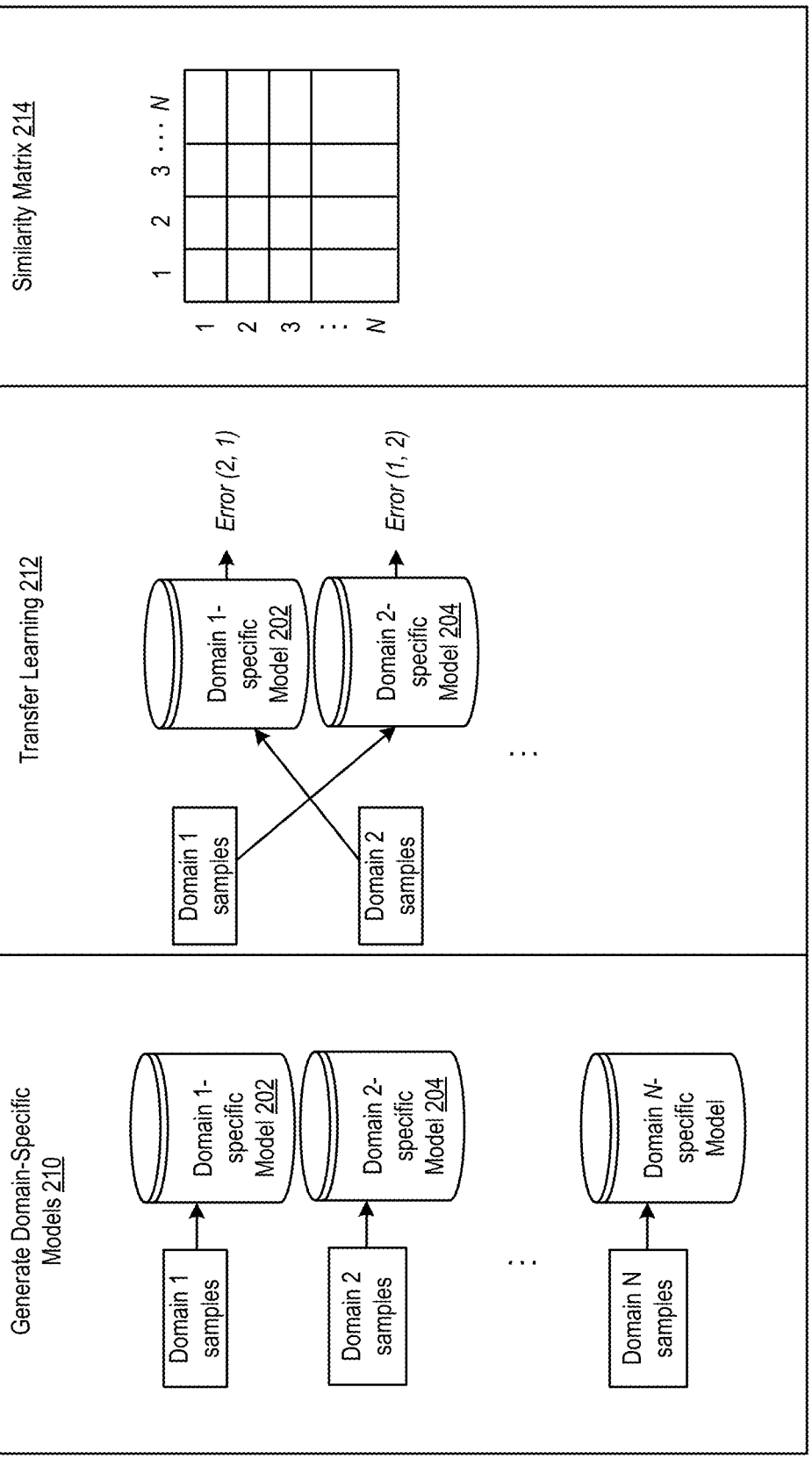
FIG. 2 is a diagram illustrating an example process for determining similarities between different domains, in accordance with various embodiments of the present disclosure.

FIG. 2 is a diagram illustrating an example process for determining similarities between different domains, in accordance with various embodiments of the present disclosure.

The training data from each domain may be used to generate domain-specific machine learning models 210. For example, as depicted in FIG. 2, Domain 1 samples are used to train a Domain 1-specific model 202 (e.g., a feed forward neural network used to predict import fee deposits). Similarly, Domain 2 samples are used to train a Domain 2-specific model 204, and so on.

As an example implementation, each domain-specific model is a feed forward neural network using ReLU as an activation function across all layers.

The optimization function is defined as:

$$\text{Loss} = 2[\alpha \text{ReLU}(\varepsilon_{UE}) + (1-\alpha)\text{ReLU}(\varepsilon_{OE})] \quad (1)$$

$$\varepsilon_{UE} = \text{IFD}_{actual} - \text{IFD}_{prediction} \quad (2)$$

$$\varepsilon_{OE} = \text{IFD}_{prediction} - \text{IFD}_{actual} \quad (3)$$

where ReLU is the ReLu activation function defined as $\text{ReLU}(x) = \max(0, x)$, $\text{IFD}_{prediction}$ is the machine learning model prediction value of the import fee deposit and $\text{IFD}_{actual}$ is the actual import fee deposit value, $\varepsilon_{UE}$ is the error in predicting underestimates when $\text{IFD}_{actual} > \text{IFD}_{prediction}$, $\varepsilon_{OE}$ is the error in predicting overestimates when $\text{IFD}_{actual} < \text{IFD}_{prediction}$, and a is used to predict the quantile of the target label. When $\alpha > 0.5$, UE is penalized, and when $\alpha < 0.5$, OE is penalized. Accordingly, alpha can be increased to penalize underestimates and decreased to penalize overestimates.

Thereafter, a transfer learning approach 212 is used, where each domain-specific model generated at 210 is used to predict an outcome for the samples from each other domain. For example, Domain 1-specific model 202 is used to predict the import fee deposit for each sample of Domain 2. The predicted import fee deposit (IFD) is compared to the actual ground truth import fee deposit for each sample. For example, the mean average error value is determined as:

$$\mathcal{MAE} = \frac{1}{N} \sum \left| IFD_{prediction} - IFD_{actual} \right|$$

by averaging the error values for each sample. In FIG. 2, the error associated with Domain 1-specific model 202 being used to predict the import fee deposit for Domain 2 samples is $\mathcal{MAE}(1, 2)$ using the notation $\mathcal{MAE}_{XY}$, where X is the domain-specific model and Y is the sample_domain)). Each domain-specific model (e.g., domain-specific models 1-N) is used to predict the errors for every other domain's data. In some examples, some domains may be excluded from the operations described above. For example, if the number of training samples from a particular domain is less than a gateway threshold, that domain may be excluded from the similarity matrix 214.

In the import fee deposit example prediction problem, the target and source domain are presumably countries. The feature space $\mathcal{F}$ is the same but the marginal probability distribution P(F) is different. Consequently, there are different domains. The tasks of predicting the import fee deposits in the different domains (countries) are similar if the prediction instances f(•) are relatively close. Accordingly, the goal is to measure how close the prediction instance between domains is, using pre-trained domain-specific models generated at 210.

In an informal example, in import fee deposit prediction, a model used to train United States to Germany exports is re-used to predict the import fee deposit value for United States to United Kingdom exports (e.g., a prediction value).

The same target currency is used to provide a common denominator for the different countries and models. The goal is not to use the United States to Germany model to predict United States to United Kingdom import fee deposit charges but to measure the prediction error. In other words, how far off is the error using the United States to Germany model when applying the United States to United Kingdom data. This error value is used as a proxy for similarity between the two domains.

The error results are used to generate similarity matrix 214 expressing the similarity between the various models/domains. The similarity matrix 214 may be non-symmetric, meaning that the transpose of the matrix is not the same as the original similarity matrix 214. The goal after generation of the similarity matrix is to cluster similar domains together (e.g., into Cluster 1, Cluster 2, . . . , Cluster N). However, the locations of the data points of the similarity matrix 214 (e.g., the errors resulting from using domain-specific models to form predictions on data from different domains) are not defined in a symmetric clustering graph used by clustering algorithms. However, graph clustering algorithms may be used to determine the similarity between the different domains based on the errors in similarity matrix 214. Graph clustering algorithms often require symmetric matrices in order to cluster similar matrix elements into groups.

In various examples, instead of using graph clustering to determine groupings of similar domains, a heuristic and/or rule-based approach may be used to determine a similarity between two domains based on the error values $\mathcal{M} \mathcal{A} \times_{XY}$. Generally, smaller error values $\mathcal{M} \mathcal{A} \mathcal{E}_{XY}$ indicate that the domains being compared are similar to one another, while larger error values indicate that the domains being compared are dissimilar to one another. Accordingly, heuristic and/or rule-based approaches may group domains together into a cluster based on the $\mathcal{M} \mathcal{A} \mathcal{E}_{XY}$ (the average error value for predictions generated using a model trained using domain X when predicting output for training samples from domain Y) being less than a threshold error value. Similarly, heuristic and/or rule-based approaches may split domains between clusters based on the $\mathcal{M} \mathcal{A} \mathcal{E} \mathcal{M} \mathcal{A} \mathcal{E}_{XY}$ exceeding a threshold value.

Figure 3:
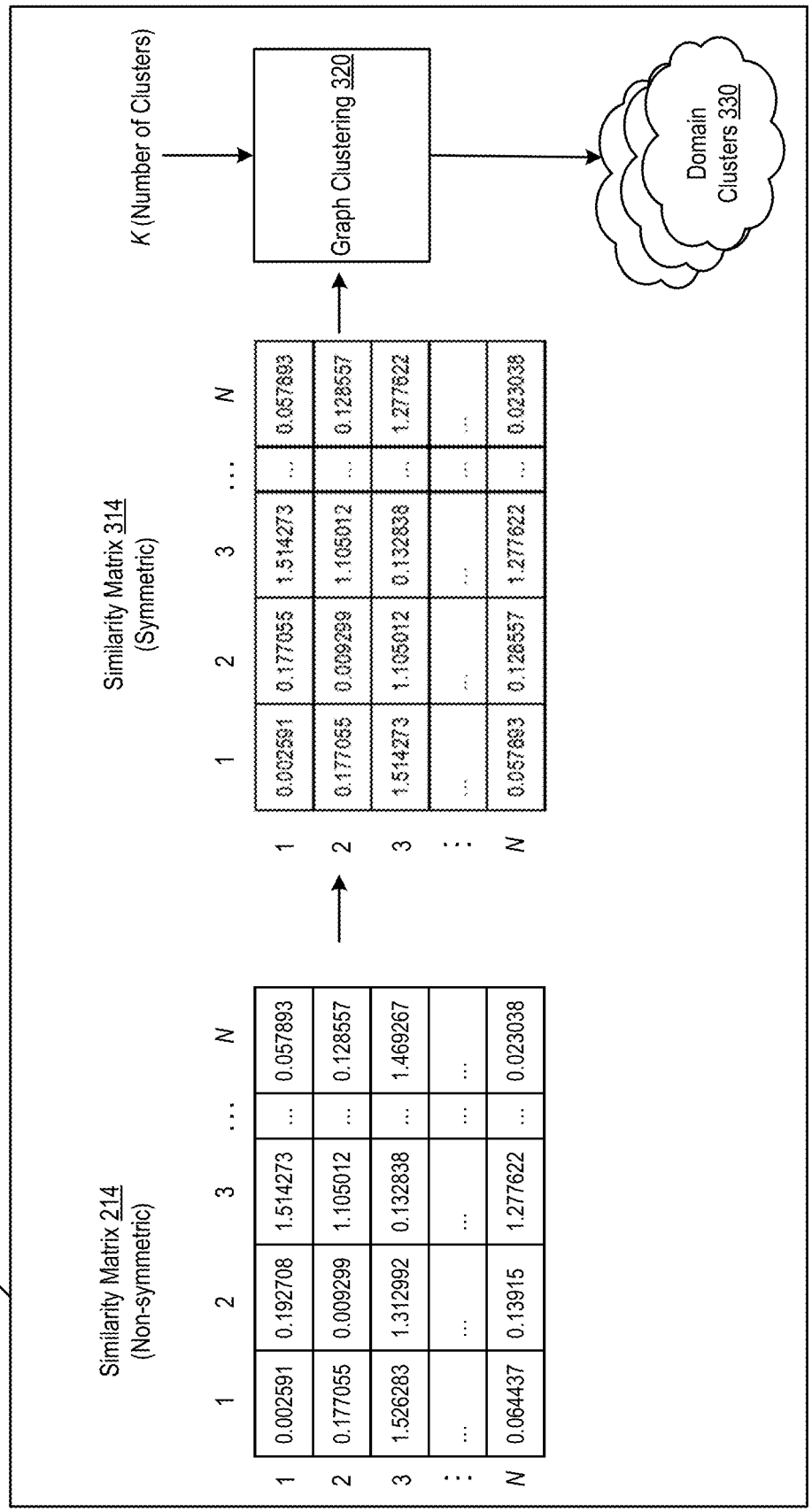
FIG. 3 is a diagram illustrating an example technique for clustering domains, in accordance with various aspects of the present disclosure.

FIG. 3 is a diagram illustrating an example technique for clustering domains, in accordance with various aspects of the present disclosure.

Various heuristic methods may be used to transform non-symmetric similarity matrix 214 into a symmetric similarity matrix 314. For example, in a first approach, each row of the similarity matrix 214 is normalized and then the average of $\mathcal{M} \mathcal{A} \mathcal{E}_{XY}$ and $\mathcal{M} \mathcal{A} \mathcal{E}_{YX}$ is determined. The average is then used to replace $\mathcal{M} \mathcal{A} \mathcal{E}_{XY}$ and $\mathcal{M} \mathcal{A} \mathcal{E}_{YX}$. In a second approach, each column of the similarity matrix 214 is normalized and then the average of $\mathcal{M} \mathcal{A} \mathcal{E}_{XY}$ and $\mathcal{M} \mathcal{A} \mathcal{E}_{YX}$ is determined and used to replace $\mathcal{M} \mathcal{A} \mathcal{E}_{XY}$ and $\mathcal{M} \mathcal{A} \mathcal{E}_{YX}$. In a third approach, the minimum value of $\mathcal{M} \mathcal{A} \mathcal{E}_{XY}$ and $\mathcal{M} \mathcal{A} \mathcal{E}_{YX}$ may be used to replace $\mathcal{M} \mathcal{A} \mathcal{E}_{XY}$ and $\mathcal{M} \mathcal{A} \mathcal{E}_{YX}$. Although three approaches are described above, it should be appreciated that other methods for generating a symmetric matrix from a non-symmetric matrix are known and that the particular technique for generating a symmetric matrix may vary according to the desired implementation.

In various examples, graph clustering 320 may be used to determine domain clusters 330 from the symmetric matrix 314. Domain clusters 330 may be clusters of similar domains. Any number of clusters may be generated, according to the desired implementation.

One example of graph clustering 320 includes spectral clustering. Spectral Clustering is a technique known to those skilled in the art that uses a spectral method to identify clusters. Spectral clustering starts from a similarity graph (e.g., similarity matrix 314) and a number of clusters K to use. From there, spectral clustering computes the first K eigen vectors of the Laplacian matrix to define a feature vector for each domain. Then k-means is performed to identify the membership of each domain to a cluster (e.g., to one of domain clusters 330). The number K of domain clusters 330 may be selected according to various constraints. For example, K may be selected based on the engineering cost (e.g., of running and/or maintaining K machine learning models at a given time) and the predictive performance of the cluster prediction models (e.g., cluster 1 prediction model 142, cluster 2 prediction model 144, etc., of FIG. 1).

Various graph clustering techniques are known to those of skill in the art. Although spectral clustering is described above, in general, any graph clustering technique may be used to perform graph clustering 320 to determine and cluster together similar domains (e.g., domain clusters 330) based on similarity matrix 314, in accordance with the present disclosure.

Figure 4:
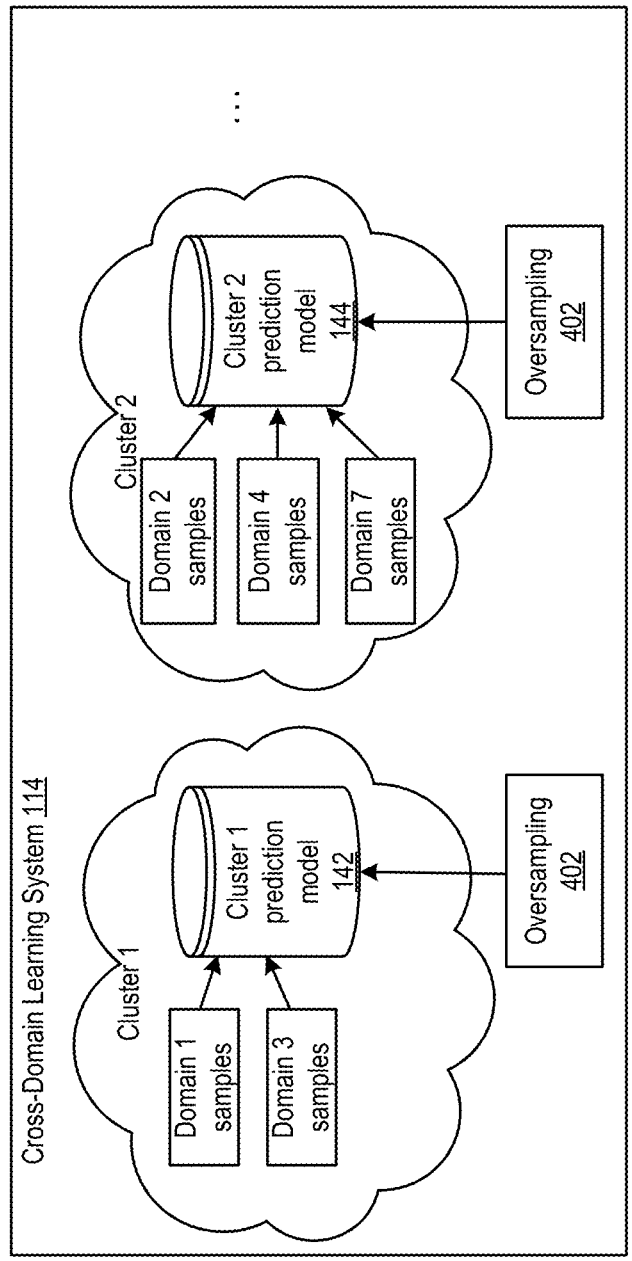
FIG. 4 is a diagram depicting training machine learning models for the clustered domains, in accordance with various aspects of the present disclosure.

FIG. 4 is a diagram depicting training machine learning models for the clustered domains, in accordance with various aspects of the present disclosure.

After the clustering of similar domains described above, the data for the clustered domains may be combined and used to train one or more machine learning models for the cluster. For example, as shown in FIG. 4, Domain 1 and Domain 3 may be clustered in Cluster 1. Accordingly, sample data for Domain 1 and Domain 3 may be used to train Cluster 1 prediction model 142. Similarly, Domain 2, Domain 4, and Domain 7 may be clustered in Cluster 2. Accordingly, sample data for Domain 2, Domain 4, and Domain 7 may be used to train Cluster 2 prediction model 144.

In addition, in an embodiment, oversampling 402 is used to emphasize under-sampled populations during training. For example, the number of samples in Domain 1 may greatly exceed the number of samples in Domain 3 of Cluster 1. Accordingly, in one oversampling technique a percentage of Domain 3 samples are duplicated (e.g., additional copies are added during training) in order to emphasize the under-sampled domain (e.g., Domain 3). In another example of oversampling 402, equation (4) is used to provide a weight for each sample. The sample weight ($W_{sample}$) is then multiplied by the loss from equation (1), above, to emphasize under-sampled domains.

$$W_{sample} = 1 - \frac{N_{Domain}}{N_{total}} \qquad (4)$$

where $N_{total}$ is the total number of samples from all domains in the cluster and $N_{Domain}$ is the number of samples for the particular domain.

Advantageously, grouping the various domains together based on a similarity in the domains provides additional training data (beyond what is available for a single domain) that can be used to improve model performance. Additionally, use of a single machine learning model for multiple similar domains can reduce compute and engineering overhead relative to maintaining a single model for each domain.

In various embodiments, after the clusters of domains are determined, model hyper-parameters can be optimized prior to training the models of each cluster. However, since there is a single optimized value for each hyper-parameter (including a) for each domain in a group, the optimal result may not be achieved by optimizing model hyper-parameters after training one model for a cluster of domains. Accordingly, one option is to use the group data (e.g., the sample data for each domain in the cluster) for training a group model, but to optimize the hyper-parameters for each domain-specific model independently (resulting in multiple machine learning models per cluster). This approach (e.g., determining optimized hyper-parameters for each individual domain) increases performance at the expense of engineering/compute overhead. Using too many domains in a group may exceed the limit of data that fits in the training machine leading to larger machines and higher costs. Clusters may sometimes instead be referred to as "groupings" of domains. In some examples, using too many domains (and/or too much sample data for a grouping of domains) results in slower training of prediction models. Accordingly, the number of domains for a cluster may be a hyperparameter that may be optimized In various examples, the number of clusters/groupings of domains may be a hyperparameter that can be optimized. Generally, there is often a trade off between engineering/compute cost and model performance. Accordingly, higher model predictive performance may result in higher engineering cost.

After training, each domain in a cluster may use the machine learning model that has been trained for that cluster during prediction. For example, if Cluster 1 includes the domains: United States to France, Germany to France, and Canada to Spain, a machine learning model trained using the sample data from the three domains may be used to predict the import fee deposit for any of the three domains. These predictions can be compared to the ground truth data for each of the domains to generate a similarity matrix, as will be described in greater detail below.

Figure 5:
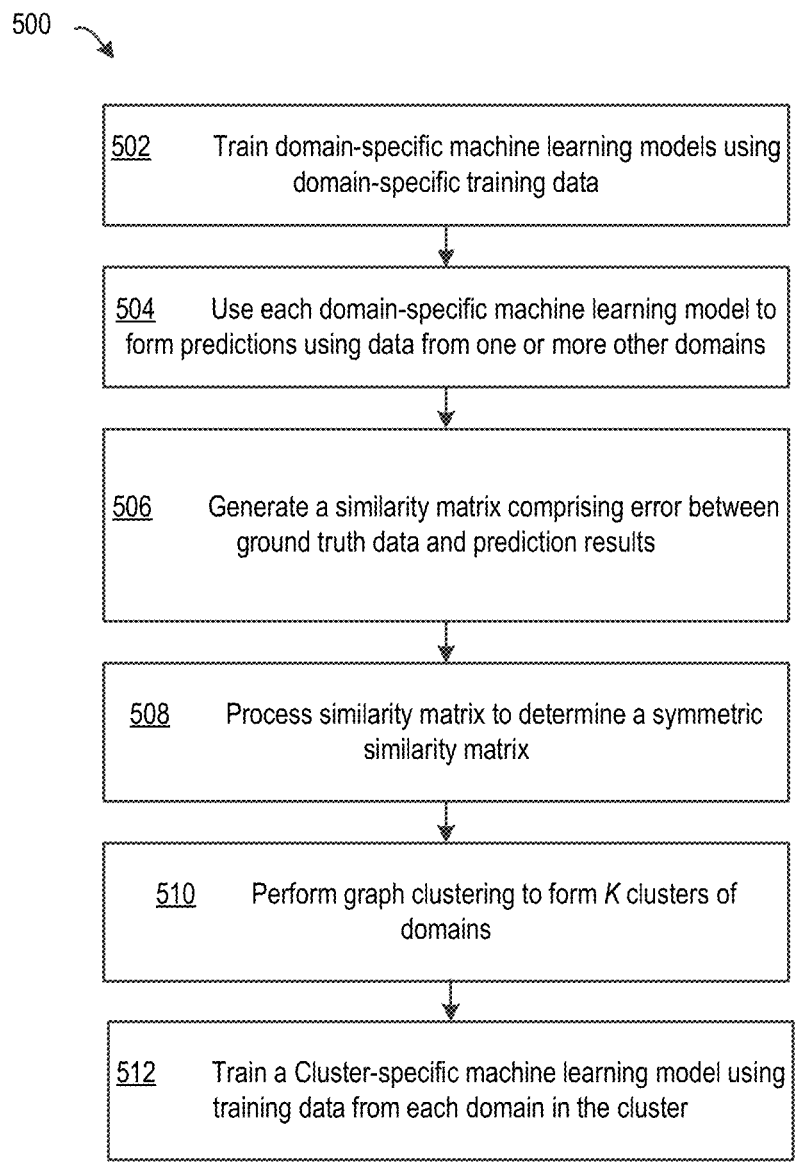
FIG. 5 is a process for using cross-domain learning to generate a machine learning model for a plurality of similar domains, in accordance with various aspects of the present disclosure.

FIG. 5 depicts a flow chart showing an example process 500 for providing cross-domain learning, in accordance with various aspects of the present disclosure. Those portions of FIG. 5 that have been previously discussed in reference to FIGS. 1-4 may not be described again for purposes of clarity and brevity. The actions of the process 500 may represent a series of instructions comprising computer-readable machine code executable by one or more processing units (e.g., CPUs, GPUs, tensor processors, etc.) of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the various techniques described herein.

Process 500 may begin at action 502, "Train domain-specific machine learning models using domain-specific training data." At action 502, domain-specific machine learning models may be trained using domain-specific training data. For example, United States to Great Britain training data is used to train a feed forward neural network useful for prediction of import fee deposits for the United States to Great Britain domain. Similarly, France to Germany training data is used to train another feed forward neural network useful for prediction of import fee deposits for the France to Germany domain, and so on.

Processing may continue from action 502 to action 504, "Use each domain-specific machine learning model to form predictions using data from one or more other domains." At action 504, data from one or more other domains, apart from the domain for which a machine learning model was trained, may be sent to the machine learning model. For example, for the feed forward neural network trained for prediction for the France to Germany domain, data from one or more other domains (apart from the France to Germany domain) may be sent to the feed forward neural network for prediction. For example, data describing an order to be sent from the United States to Canada may be sent to the France to Germany model to determine how accurately the France to Germany model can predict an import deposit fee for an order shipped from the United States to Canada. As previously described, in an example embodiment, some domains are excluded from the operations described above. For example, if the number of training samples from a particular domain is less than a gateway threshold, that domain can be excluded from the similarity matrix 214.

Processing may continue from action 504 to action 506, "Generate a similarity matrix comprising the error between ground truth data and prediction results." At action 506, the error resulting from sending different domains' data to the machine learning models is determined and used to populate a similarity matrix. In various examples, each column of the similarity matrix may represent the domain for which a model has been trained and each row may represent the domain of the input data. In another example, the columns may represent the input data while the rows may represent the domain of the model. The elements of the matrix may comprise the error when the data of the particular domain is used to predict an outcome for the model trained using a different domain.

Processing may continue from action 506 to action 508, "Process similarity matrix to determine a symmetric similarity matrix." At action 508, the similarity matrix may be processed to determine a symmetric similarity matrix. For example, in a first approach, each row of the similarity matrix 214 is normalized and then the average of $\mathcal{M} \mathcal{A} \mathcal{E}_{XY}$ and $\mathcal{M} \mathcal{A} \mathcal{E}_{YX}$ is determined. In a second approach, each column of the similarity matrix 214 is normalized and then the average of $\mathcal{M} \mathcal{A} \mathcal{E}_{XY}$ and $\mathcal{M} \mathcal{A} \mathcal{E}_{YX}$ is determined. In a third approach, the minimum value of $\mathcal{M} \mathcal{A} \mathcal{E}_{XY}$ and $\mathcal{M} \mathcal{A} \mathcal{E}_{YX}$ may be used. Although three approaches are described above, it should be appreciated that other methods for generating a symmetric matrix from a non-symmetric matrix are known and that the particular technique for generating a symmetric matrix may vary according to the desired implementation.

Processing may continue from action 508 to action 510, "Perform graph clustering to form K clusters of domains." At action 510, graph clustering may be used to determine clusters of one or more similar domains based on the error determined using transfer learning techniques. For example, a $\mathcal{M} \mathcal{A} \mathcal{E}$ for a model trained on the United States to France domain may be used to predict the IFD for a France to Great Britain domain and an Italy to Spain domain. If the errors for these two cross-domain predictions are similar, the graph clustering algorithm may group the two domains (e.g., the France to Great Britain domain and the Italy to Spain domain) together into a cluster to increase the amount of training data.

Processing may continue from action 510 to action 512, "Train cluster-specific machine learning model using training data from each domain in the cluster." After the clusters are determined at action 510, new machine learning models are trained using the combined training data from each domain in the cluster. The trained machine learning model may thereafter be used for prediction for any of the domains of that cluster.

Figures 8A, 8B:
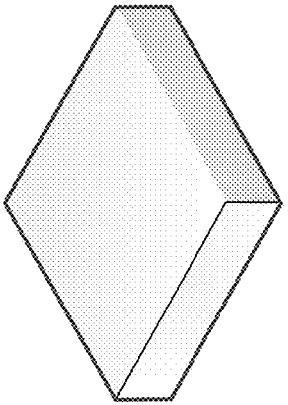
FIGS. 8A-8B are example user interfaces illustrating import fee deposit predictions that may be used in accordance with embodiments of the present disclosure.

FIGS. 8A-8B are examples of online shopping user interfaces illustrating import fee deposit charges that a user may view when making a purchase in accordance with embodiments of the present disclosure. FIG. 8A shows a order checkout screen 800, with an Import Fees Deposit amount 802 added to the total cost of the order. The import fee deposit of $20.95 can be determined using the various embodiments described herein. FIG. 8B shows a second example of an order checkout screen 810, with a Shipping & Import Fees Deposit amount 812 added to the total cost of the order. Here, the import fee deposit can be determined using the various embodiments described herein and added to the shipping cost to produce the total Shipping & Import Fees Deposit amount of $32.01.

Figure 6:
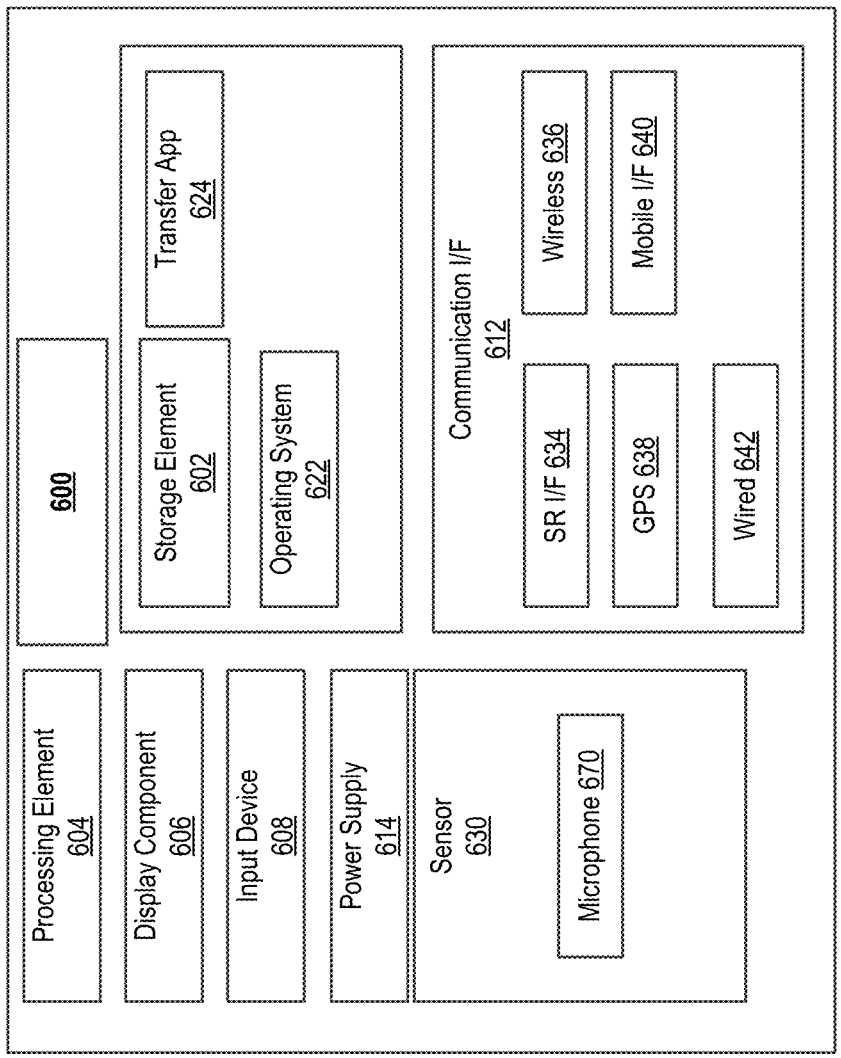
FIG. 6 is a block diagram showing an example architecture of a computing device that may be used in accordance with various embodiments described herein.

FIG. 6 is a block diagram showing an example architecture 600 of a computing device used to implement cross-domain learning system 114, in accordance with various aspects of the present disclosure. It will be appreciated that not all devices will include all of the components of the architecture 600 and some user devices may include additional components not shown in the architecture 600. In an example embodiment, the architecture 600 includes one or more processing elements 604 for executing instructions and retrieving data stored in a storage element 602. The processing element 604 comprises at least one processor. Any suitable processor or processors may be used. For example, the processing element 604 may comprise one or more central processing units (CPUs), tensor processing circuits, digital signal processors (DSPs), etc. The storage element 602 can include one or more different types of memory, data storage, or computer-readable storage media devoted to different purposes within the architecture 600. In an example embodiment, the storage element 602 comprises flash memory, random-access memory, disk-based storage, etc. Different portions of the storage element 602, for example, are used for program instructions for execution by the processing element 604 and/or a removable storage for transferring data to other devices, etc. Additionally, storage element 602 may store various weight sets and/or machine learning models described herein.

The storage element 602 also stores software for execution by the processing elements 604. An operating system 622 provides the user with an interface for operating the computing device and may facilitate communications and commands between applications executing on the architecture 600 and various hardware thereof. In an example embodiment, a transfer application 624 is configured to receive images, audio, and/or video from another device (e.g., a mobile device, image capture device, and/or display device) or from an image sensor 632 and/or microphone 670 included in the architecture 600.

When implemented in some user devices, the architecture 600 comprises a display component 606. The display component 606 can comprise one or more light-emitting diodes (LEDs) or other suitable display lamps. Also, in some examples, the display component 606 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 606 may be effective to display input images and/or segmentation masks generated in accordance with the various techniques described herein.

The architecture 600 may also include one or more input devices 608 operable to receive inputs from a user. Example input devices 608 include a push button, touch pad, touch screen, wheel, joystick, keyboard, mouse, trackball, keypad, light gun, game controller, or any other such device or element whereby a user can provide inputs to the architecture 600. These input devices 608 may be incorporated into the architecture 600 or operably coupled to the architecture 600 via wired or wireless interface. In some examples, architecture 600 may include a microphone 670 or an array of microphones for capturing sounds, such as voice requests. In various examples, audio captured by microphone 670 may be streamed to external computing devices via communication interface 612.

When the display component 606 includes a touch-sensitive display, the input devices 608 can include a touch sensor that operates in conjunction with the display component 606 to permit users to interact with the image displayed by the display component 606 using touch inputs (e.g., with a finger or stylus). The architecture 600 may also include a power supply 614, such as a wired alternating current (AC) converter, a rechargeable battery operable to be recharged through conventional plug-in approaches, or through other approaches such as capacitive or inductive charging.

In an embodiment, the communication interface 612 comprises one or more wired or wireless components operable to communicate with one or more other computing devices. For example, the communication interface 612 may comprise a wireless communication module 636 configured to communicate on a network, such as the network 104, according to any suitable wireless protocol, such as IEEE 802.11 or another suitable wireless local area network (WLAN) protocol. In an embodiment, a short range interface 634 is configured to communicate using one or more short range wireless protocols such as, for example, near field communications (NFC), Bluetooth®, Bluetooth LE, etc. In an embodiment, a mobile interface 640 is configured to communicate utilizing a cellular or other mobile protocol. A Global Positioning System (GPS) interface 638 may be in communication with one or more earth-orbiting satellites or other suitable position-determining systems to identify a position of the architecture 600. In an embodiment, a wired communication module 642 is configured to communicate according to the USB protocol or any other suitable protocol.

The architecture 600 may also include one or more sensors 630 such as, for example, one or more position sensors, image sensors, and/or motion sensors.

As noted above, multiple devices may be employed in a single system. In such a multi-device system, each of the devices may include different components for performing different aspects of the system's processing. The multiple devices may include overlapping components. The components of the cross-domain learning system 114, as described herein, are exemplary, and may be located as a stand-alone device or may be included, in whole or in part, as a component of a larger device or system.

Figure 7:
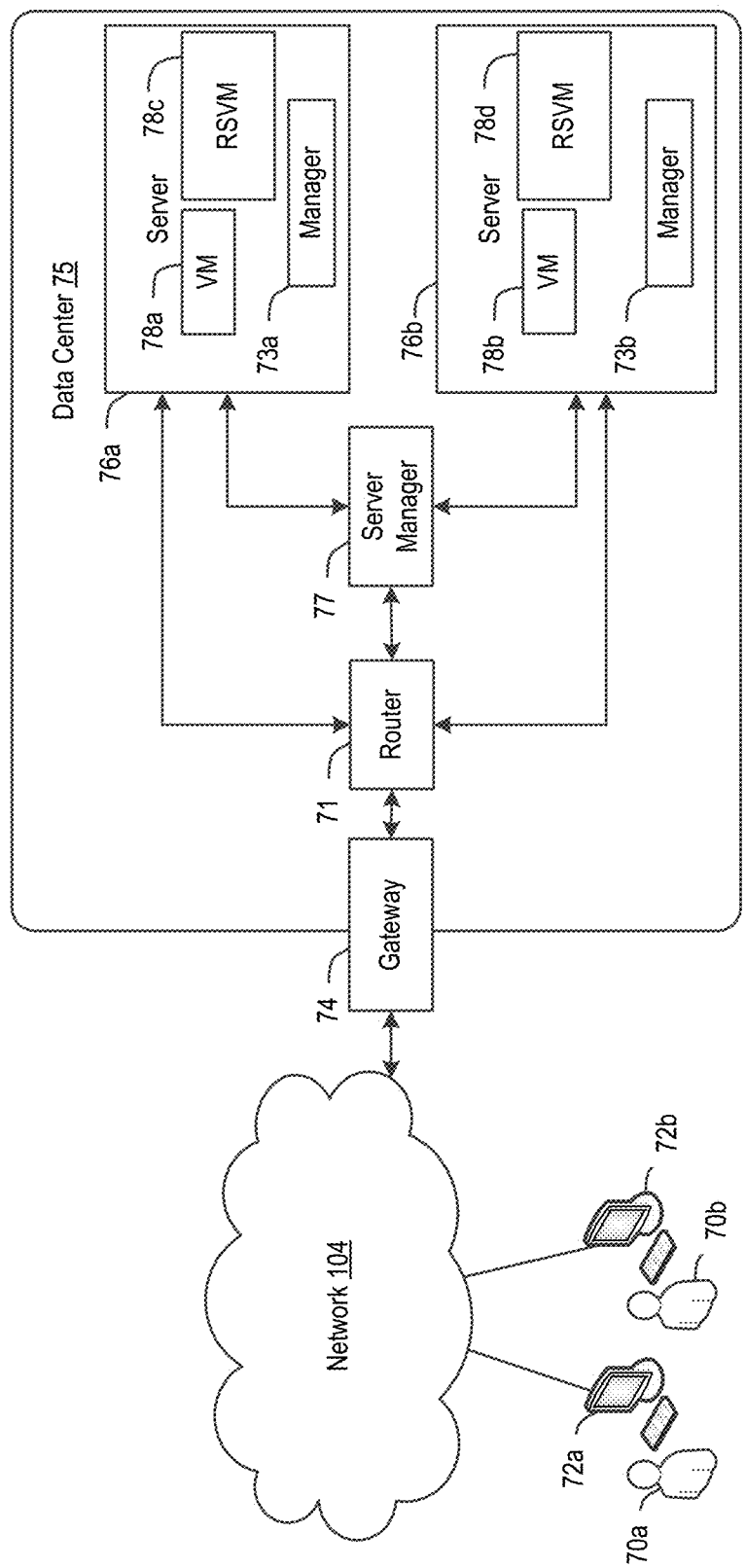
FIG. 7 is a diagram illustrating an example system for sending and providing data that may be used in accordance with embodiments of the present disclosure.

An example system for sending and providing data and performing various computer processing techniques will now be described in detail. In particular, FIG. 7 illustrates an example computing environment in which the embodiments described herein may be implemented. For example, the computing environment of FIG. 7 may be used to provide cross-domain machine learning for imbalanced domains over a network wherein one or more of the techniques described herein may be requested by a first computing device and may be performed by a different computing device configured in communication with the first computing device over a network. FIG. 7 is a diagram schematically illustrating an example of a data center 75 that can provide computing resources to users 70a and 70b (which may be referred herein singularly as user 70 or in the plural as users 70) via user computers 72a and 72b (which may be referred herein singularly as user computer 72 or in the plural as user computers 72) via network 104. Data center 75 may be configured to provide computing resources for executing applications on a permanent or an as-needed basis. The computing resources provided by data center 75 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the cross-domain learning system 114, as described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 75 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). In at least some examples, server manager 77 may control operation of and/or maintain servers 76. Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 72. User computers 72 may be computers utilized by users 70 or other customers of data center 75. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 75. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 75. In this regard, data center 75 might provide a gateway or web interface through which aspects of its operation may be configured through the use of a web browser application program executing on user computer 72. Alternately, a stand-alone application program executing on user computer 72 might access an application programming interface (API) exposed by data center 75 for performing the configuration operations. Other mechanisms for configuring the operation of various web services available at data center 75 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 73*a* or 73*b* (which may be referred herein singularly as instance manager 73 or in the plural as instance managers 73) capable of executing the virtual machine instances 78. The instance managers 73 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 75 shown in FIG. 7, a router 71 may be utilized to interconnect the servers 76*a* and 76*b*. Router 71 may also be connected to gateway 74, which is connected to network 104. Router 71 may be connected to one or more load balancers, and alone or in combination may manage communications within networks in data center 75, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 75 shown in FIG. 7, a data center 75 is also employed to at least in part direct various communications to, from and/or between servers 76*a* and 76*b*. While FIG. 7 depicts router 71 positioned between gateway 74 and data center 75, this is merely an exemplary configuration. In some cases, for example, data center 75 may be positioned between gateway 74 and router 71. Data center 75 may, in some cases, examine portions of incoming communications from user computers 72 to determine one or more appropriate servers 76 to receive and/or process the incoming communications. Data center 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Data center 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 75 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of cross-domain machine learning, the method comprising:
    sending first data of a first domain to a first machine learning model trained using second data of a second domain;
    determining a first error describing a difference between predicted values generated by the first machine learning model and actual values of the first data of the first domain;

sending the second data of the second domain to a second machine learning model trained using the first data of the first domain;
determining a second error describing a difference between predicted values generated by the second machine learning model and actual values of the second data of the second domain;
determining a similarity between the first domain and the second domain based on the first error and the second error;
training a third machine learning model using the first data of the first domain and the second data of the second domain;
receiving third data of the first domain; and
generating a prediction for the third data using the third machine learning model.

2. The computer-implemented method of claim 1, further comprising:
generating, using the first error and the second error, a similarity matrix describing similarities among the first domain and the second domain.

3. The computer-implemented method of claim 1, further comprising:
determining a plurality of groupings of domains; and
generating, for each of the plurality of groupings of domains, a respective fourth machine learning model.

4. The computer-implemented method of claim 1, further comprising:
determining a first number of samples of the first data of the first domain;
determining a total number of samples across a plurality of domains including the first domain and the second domain; and
determining a sample weight using a ratio of the first number of samples to the total number of samples, wherein the training the third machine learning model comprises applying the sample weight to a loss function of the third machine learning model.

5. The computer-implemented method of claim 1, further comprising:
determining a first optimized hyper-parameter for the first machine learning model; and
determining a second optimized hyper-parameter for the second machine learning model.

6. The computer-implemented method of claim 5, further comprising:
training the first machine learning model using the first data of the first domain and the second data of the second domain; and
training the second machine learning model using the first data of the first domain and the second data of the second domain.

7. The computer-implemented method of claim 1, further comprising:
receiving fourth data;
determining that the fourth data corresponds to the second domain;
sending the fourth data to the third machine learning model; and
generating, by inputting the fourth data into the third machine learning model, a prediction for the fourth data.

8. A system comprising:
at least one processor; and
non-transitory computer-readable memory storing instructions that, when executed by the at least one processor, are effective to:

send first data of a first domain to a first machine learning model trained using second data of a second domain;
determine a first error describing a difference between predicted values generated by the first machine learning model and actual values of the first data of the first domain;
send the second data of the second domain to a second machine learning model trained using the first data of the first domain;
determine a second error describing a difference between predicted values generated by the second machine learning model and actual values of the second data of the second domain;
determine a similarity between the first domain and the second domain based on the first error and the second error;
train a third machine learning model using the first data of the first domain and the second data of the second domain;
receive third data of the first domain; and
generate a prediction for the third data using the third machine learning model.

9. The system of claim 8, the non-transitory computer-readable memory storing further instructions that, when executed by the at least one processor, are further effective to:
generate, using the first error and the second error, a similarity matrix describing similarities among the first domain and the second domain.

10. The system of claim 8, the non-transitory computer-readable memory storing further instructions that, when executed by the at least one processor, are further effective to:
determine a plurality of groupings of domains; and
generate, for each of the plurality of groupings of domains, a respective fourth machine learning model.

11. The system of claim 8, the non-transitory computer-readable memory storing further instructions that, when executed by the at least one processor, are further effective to:
determine a first number of samples of the first data of the first domain;
determine a total number of samples across a plurality of domains including the first domain and the second domain; and
determine a sample weight using a ratio of the first number of samples to the total number of samples, wherein the training the third machine learning model comprises applying the sample weight to a loss function of the third machine learning model.

12. The system of claim 8, the non-transitory computer-readable memory storing further instructions that, when executed by the at least one processor, are further effective to:
determine a first optimized hyper-parameter for the first machine learning model; and
determine a second optimized hyper-parameter for the second machine learning model.

13. The system of claim 12, the non-transitory computer-readable memory storing further instructions that, when executed by the at least one processor, are further effective to:
train the first machine learning model using the first data of the first domain and the second data of the second domain; and train the second machine learning model using the first data of the first domain and the second data of the second domain.

14. The system of claim 8, the non-transitory computer-readable memory storing further instructions that, when executed by the at least one processor, are further effective to:
receive fourth data;
determine that the fourth data corresponds to the second domain;
send the fourth data to the third machine learning model; and
generate, by inputting the fourth data into the third machine learning model, a prediction for the fourth data.

15. A computer-implemented method comprising:
sending first data of a first domain to a first machine learning model trained using second data of a second domain;
determining a first error describing a difference between predicted values generated by the first machine learning model and actual values of the first data of the first domain;
determining a similarity between the first domain and the second domain based on the first error and a second error associated with a second machine learning model trained using the first data of the first domain;
training a third machine learning model using the first data of the first domain and the second data of the second domain;
receiving third data of the first domain; and
generating a prediction for the third data using the third machine learning model.

16. The computer-implemented method of claim 15, further comprising:
generating, using the first error and the second error, a similarity matrix describing similarities among the first domain and the second domain.

17. The computer-implemented method of claim 15, further comprising:
determining a plurality of groupings of domains; and
generating, for each of the plurality of groupings of domains, a respective fourth machine learning model.

18. The computer-implemented method of claim 15, further comprising:
determining a first number of samples of the first data of the first domain;
determining a total number of samples across a plurality of domains including the first domain and the second domain; and
determining a sample weight using a ratio of the first number of samples to the total number of samples, wherein the training the third machine learning model comprises applying the sample weight to a loss function of the third machine learning model.

19. The computer-implemented method of claim 15, further comprising:
determining a first optimized hyper-parameter for the first machine learning model; and
determining a second optimized hyper-parameter for the second machine learning model.

20. The computer-implemented method of claim 19, further comprising:
training the first machine learning model using the first data of the first domain and the second data of the second domain; and
training the second machine learning model using the first data of the first domain and the second data of the second domain.

* * * * *